United States Patent [19]

Severson et al.

[11] Patent Number: 4,915,401
[45] Date of Patent: Apr. 10, 1990

[54] CHILD CARRIER USABLE AS BACKPACK, STROLLER AND RECLINER

[75] Inventors: William C. Severson, 2633 Boyer Ave. E., Seattle, Wash. 98102; William H. Hamilton, Seattle, Wash.

[73] Assignee: William C. Severson, Seattle, Wash.

[21] Appl. No.: 165,583

[22] Filed: Mar. 8, 1988

[51] Int. Cl.[4] ............................................. B62B 7/12
[52] U.S. Cl. ...................................... 280/30; 280/643; 280/644; 224/155
[58] Field of Search ................. 280/30, 641, 642, 643, 280/644, 647, 658, 47.37 R; 297/329, 330; 224/155, 161, 157

[56] References Cited

U.S. PATENT DOCUMENTS

| | | | |
|---|---|---|---|
| 2,346,989 | 4/1944 | O'Brien | 224/155 |
| 2,401,986 | 6/1946 | Talbott | 224/153 |
| 2,670,216 | 2/1954 | Leonard | 280/643 |
| 2,713,494 | 7/1955 | Bailey | 280/643 |
| 3,079,162 | 2/1963 | Michels, Jr. | 280/643 |
| 3,083,997 | 4/1963 | Chreist, Jr. | 297/118 |
| 3,090,634 | 5/1963 | Hesketh et al. | 280/31 |
| 3,094,339 | 6/1963 | Hurvitz | 280/31 |
| 3,116,069 | 12/1963 | Dostal | 280/30 |
| 3,334,909 | 8/1967 | Smith et al. | 280/31 |
| 3,336,039 | 8/1967 | Chute et al. | 280/41 |
| 3,459,435 | 8/1969 | Garner | 280/41 |
| 3,550,997 | 12/1970 | Strand | 280/30 |
| 3,550,998 | 12/1970 | Boudreau et al. | 280/31 |
| 3,560,015 | 2/1971 | Tracy et al. | 224/153 |
| 3,984,115 | 10/1976 | Miller | 280/30 |
| 4,157,837 | 6/1979 | Kao | 280/30 |
| 4,368,835 | 1/1983 | Murphy | 224/153 |
| 4,403,807 | 9/1983 | Wilkinson et al. | 297/217 |
| 4,586,721 | 5/1986 | Harada et al. | 280/30 |
| 4,620,711 | 11/1986 | Dick | 280/643 |
| 4,681,340 | 7/1987 | Pasquini | 280/642 |
| 4,747,526 | 5/1988 | Launes | 280/30 |

Primary Examiner—David M. Mitchell
Assistant Examiner—Richard Camby
Attorney, Agent, or Firm—Christensen, O'Connor, Johnson & Kindness

[57] ABSTRACT

A child carrier usable as a backpack and as a stroller. The carrier includes a frame having upper and lower ends in a lengthwise axis extending between the ends. Front wheels are supported by the lower end of the frame, and a child seat and backpack straps are connectable to the frame. Rear wheels are connected to the frame via a rear support assembly that includes sliders movable along the longitudinal axis of the frame, first members pivotally connected to the sliders, and second members pivotally connected to the first members and to the frame. The rear support assembly is movable to a first position in which the rear wheels are adjacent to the frame, for permitting use of the carrier as a backpack, and to a second position in which the rear wheels are positioned away from the frame, for use of the carrier as a stroller. The carrier further includes a handle pivotable between a collapsed position in which the handle is adjacent to the frame and an extended position in which the handle extends away from the frame. Movement of the handle and rear support assembly may be linked, to facilitate conversion of the carrier to the stroller configuration, and to provide a recliner configuration in which the carrier is supportable by the rear wheels and handle.

22 Claims, 8 Drawing Sheets

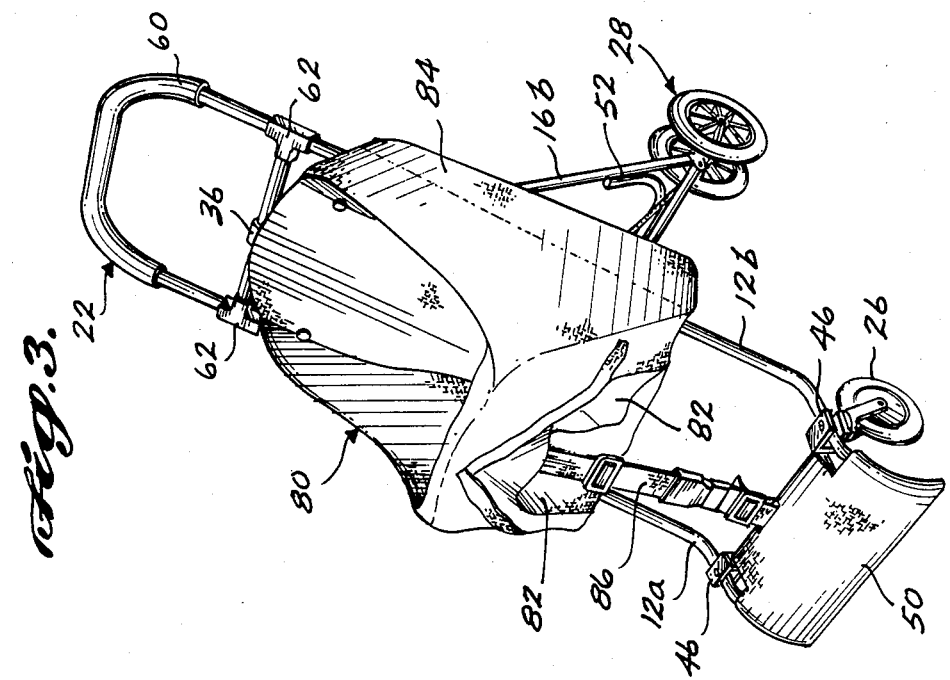
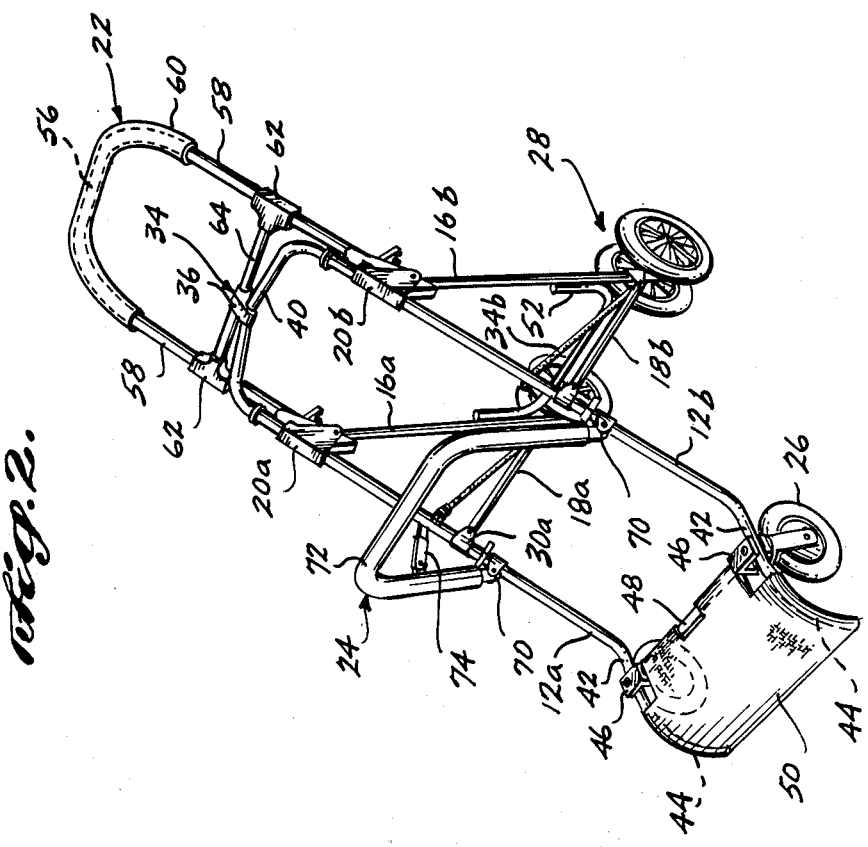

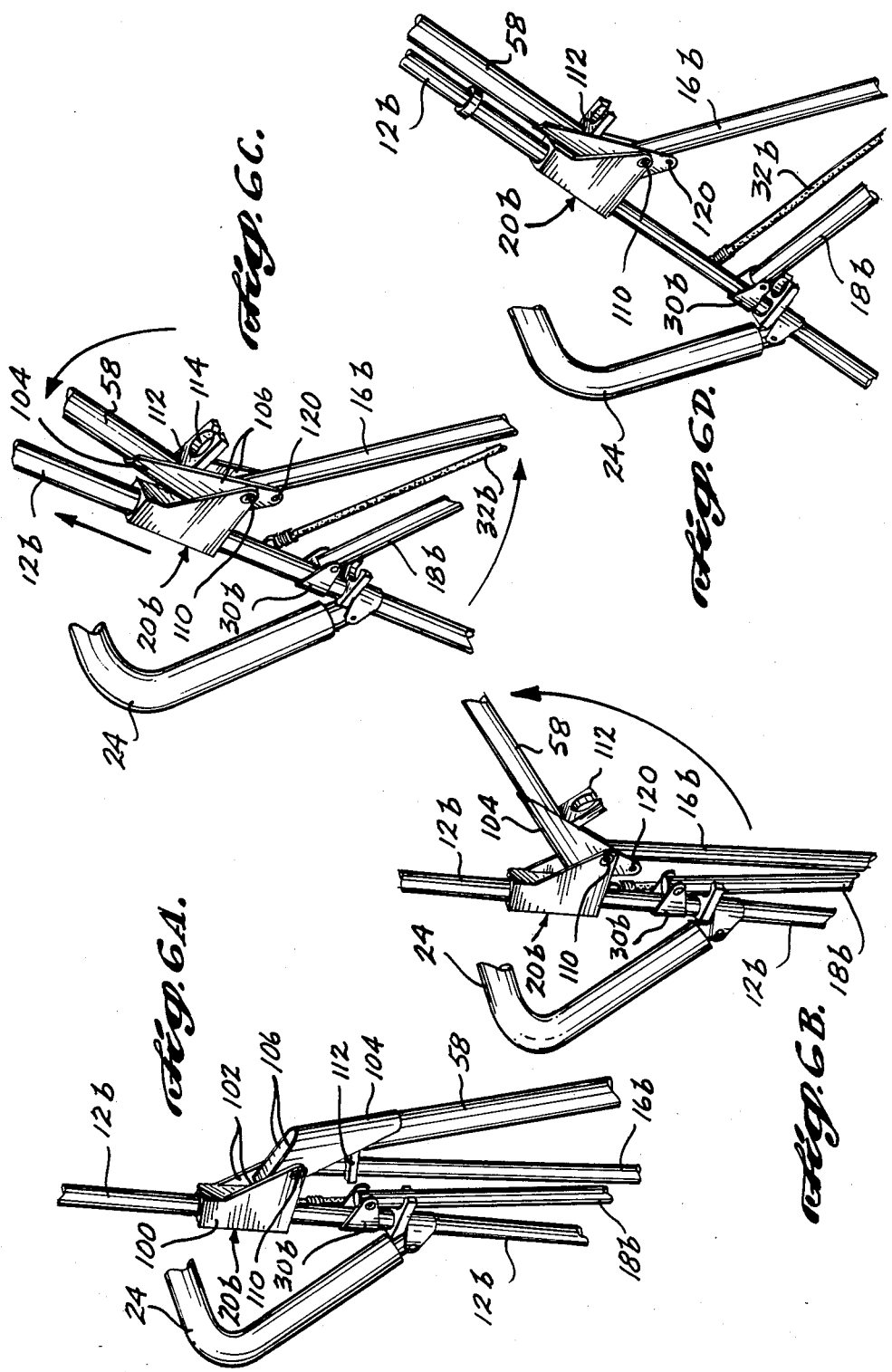

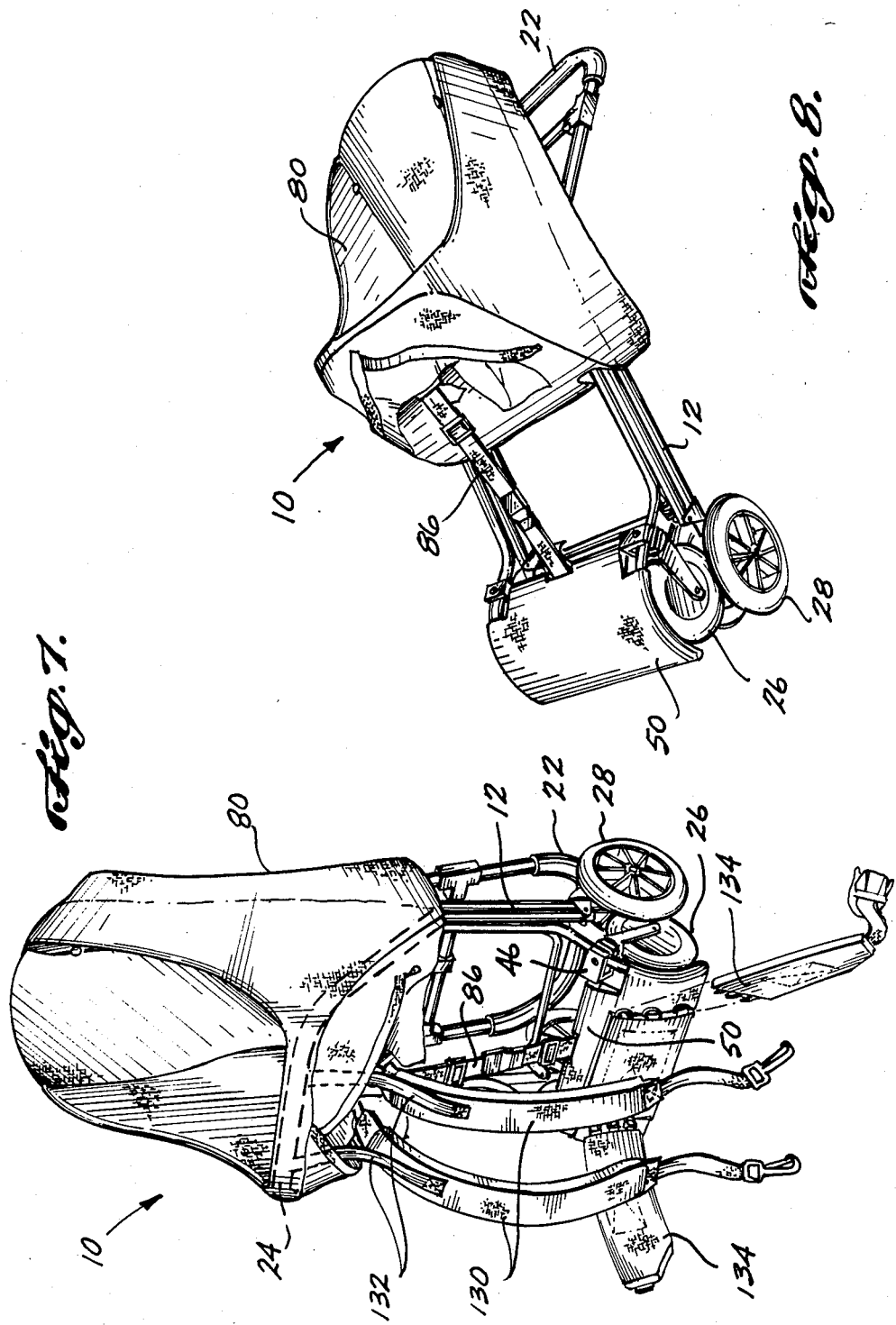

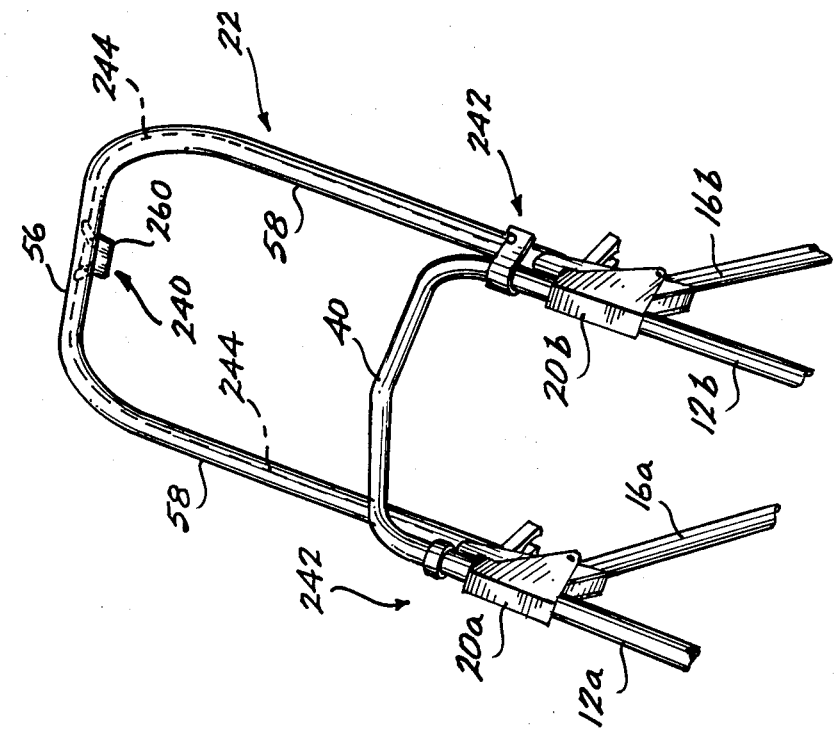
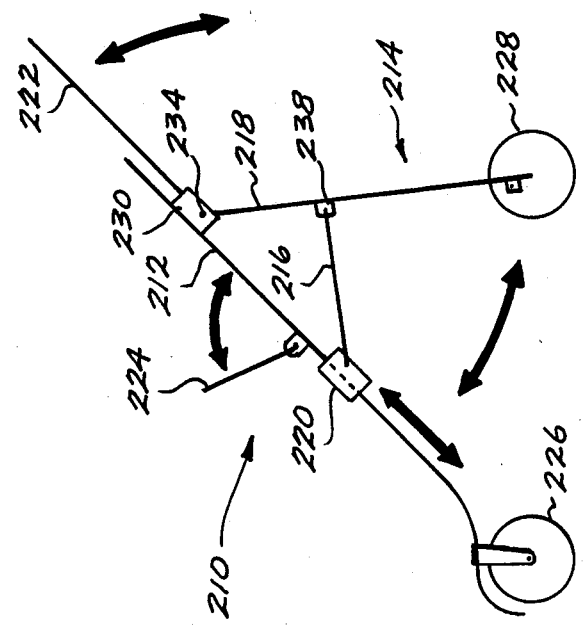

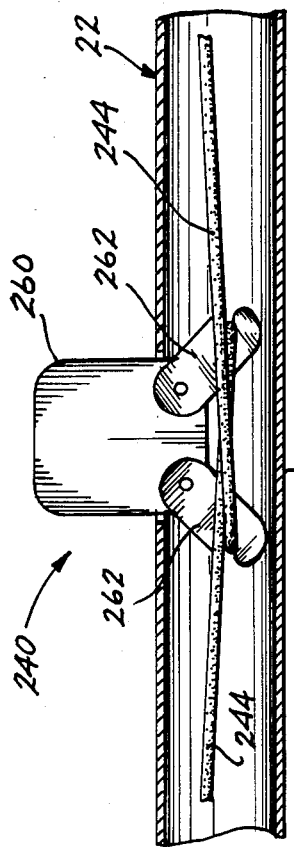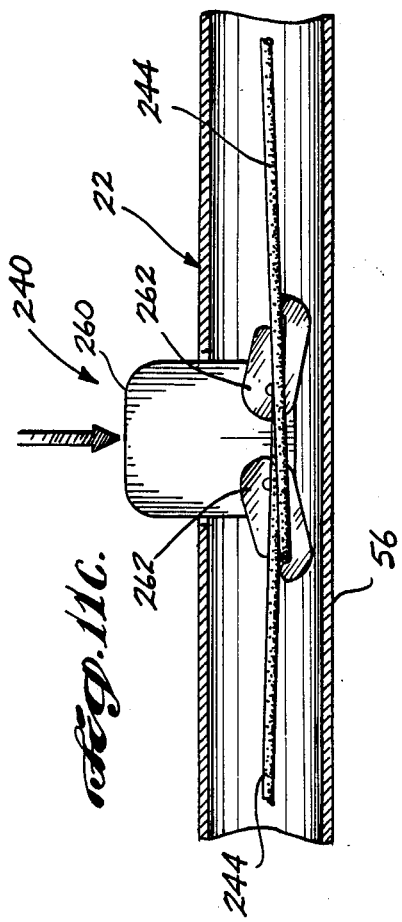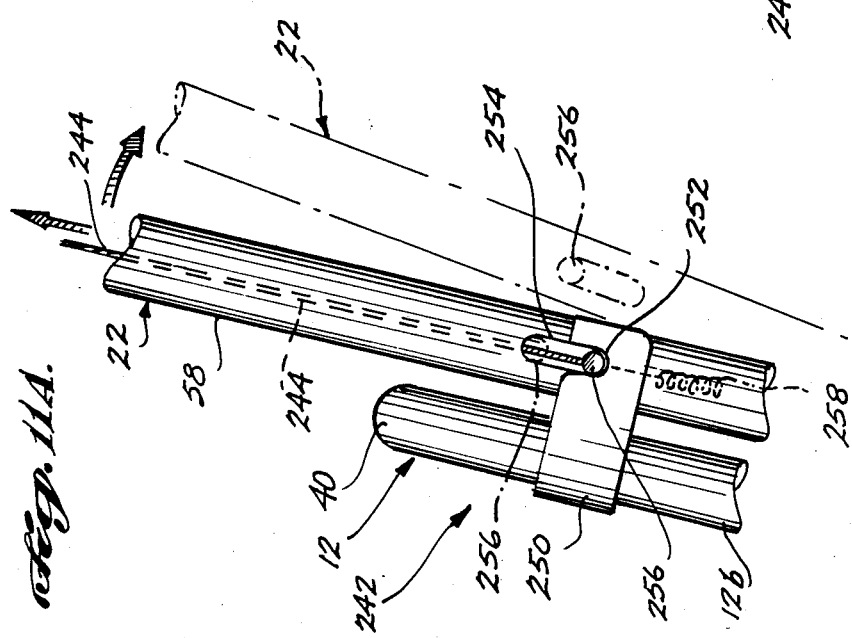

CHILD CARRIER USABLE AS BACKPACK, STROLLER AND RECLINER

FIELD OF THE INVENTION

The present invention relates to a device for carrying children, including infants, and in particular to a child carrier that may be used as a backpack, stroller, or recliner.

BACKGROUND OF THE INVENTION

The prior art includes a number of examples of child carrying devices usable both as backpacks and strollers. For example, U.S. Pat. No. 3,984,115 discloses a convertible baby carrier that can function as a backpack or as an upright stroller. In this device, the forward and rear wheels separately pivot from retracted to extended positions. U.S. Pat. No. 4,157,837 discloses a device that can function as a backpack, a baby seat, a two-wheeled stroller, and a recliner or baby bed. The stroller handle pivots downward to form part of the support in the baby seat mode. The prior art also includes a large number of examples of strollers that may be collapsed for transportation or storage.

In the design of a device that can function both as a backpack and as a stroller, there is a trade-off between the structural rigidity and stability of the device when it is used as a stroller, and the weight of the device when it is used as a backpack. Prior designs, including those mentioned above, have tended towards the production of lightweight devices that have little structural rigidity. Prior collapsible strollers, on the other hand, have tended to be comparatively massive structures that would be ill-suited for use as backpacks.

SUMMARY OF THE INVENTION

The present invention provides a sturdy but lightweight child carrier that can function as a stroller and as a backpack. In a preferred embodiment, the child carrier can also be placed in a recliner configuration for use as a child bed, and in a collapsed, storage configuration.

In a preferred embodiment, the child carrier includes a frame having upper and lower ends, and a lengthwise axis extending between the ends. The lower end of the frame supports one or more front wheels or other suitable ground support means. A rear support assembly is connected to the frame, and one or more rear wheels or other rear ground support means is rotatably mounted by the rear support assembly. The carrier also includes child support means for carrying a child, and back support means for securing the carrier to a person's back so that the carrier can be used as a backpack.

The rear support assembly comprises connection means connected to the frame such that the connection means is movable along the lengthwise axis of the frame. The rear support assembly also includes a first member pivotally connected to the connection means, and a second member pivotally connected to the first member and to the frame. The rear support assembly is moveable to a first position in which the rear wheels are adjacent to the frame, for permitting use of the device as the backpack, and to a second position in which the rear wheels are positioned away from the frame, such that the front and rear wheels are spaced apart from one another, for use of the carrier as a stroller. The carrier may further comprise a handle and means for pivotally mounting the handle such that the handle is pivotal with respect to the frame between a collapsed position in which the handle is adjacent to the frame, and an extended position in which the handle extends away from the frame. Movement of the handle is preferably linked to movement of the rear support assembly, to facilitate reconfiguration of the carrier into the stroller configuration, and to provide a recliner configuration in which the carrier is supported by the rear wheels and handle.

BRIEF DESCRIPTION OF THE DRAWINGS

FIG. 2 is a perspective view of the structural elements of the carrier in the stroller configuration;

FIG. 3 is a perspective view of the carrier in the stroller configuration;

FIGS. 6A–6C are detailed perspective views showing the conversion of the carrier from backpack configuration to recliner and stroller configurations;

FIG. 7 is a perspective view of the carrier in the backpack configuration;

FIG. 8 is a perspective view of the carrier in the recliner configuration;

FIG. 9 is a schematic side-elevational view of the structural components of a second embodiment of the carrier of the present invention;

FIG. 10 is a perspective view of a second embodiment of the latch mechanism; and FIGS. 11A–11C illustrate further details of the latch mechanism of FIG. 10.

DETAILED DESCRIPTION OF THE INVENTION

Figure 1:
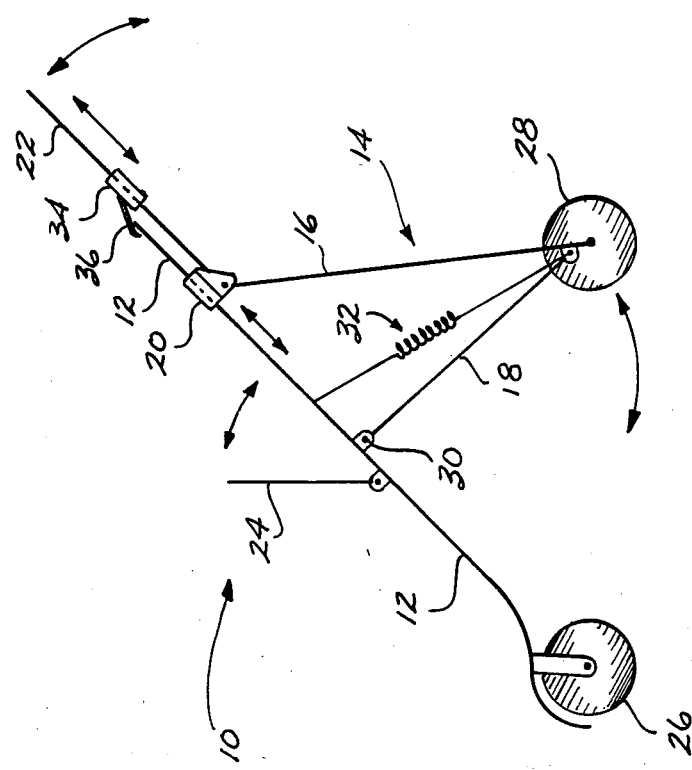
FIG. 1 is a schematic side elevational view of the structural components of the carrier in the stroller configuration.

The overall construction of a preferred embodiment of the child carrier of the present invention is set forth in FIGS. 1-3. FIG. 1 presents a side, schematic view of the main structural components of the carrier, while FIG. 2 presents a corresponding perspective view. FIG. 3 shows the carrier with a child seat installed. Referring initially to FIG. 1, the principal components of carrier 10 include frame 12, rear support assembly 14, slider 20, handle 22 and seat support 24. Rear support assembly 14 includes slider arm 16 connected to frame 12 via slider 20, and pivot arm 18 connected to frame 12 at pivot 30. The lower, forward end of frame 12 supports front wheels 26, while rear wheels 28 are supported by rear support assembly 14. In this figure, pivotal connections are indicated by dots, while the directions of movement of the various components when changing between one configuration and another are indicated by double-headed arrows.

Slider 20 is capable of movement along the longitudinal axis of frame 12, in the direction indicated by the adjacent double-headed arrow. The slider pivotally supports both the upper end of slider arm 16 and the lower end of handle 22. Pivot arm 18 includes an upper end that is pivotally connected to a fixed position on frame 12 at pivot 30, and a lower end that is pivotally connected to slider arm 16 adjacent to rear wheels 28. The rear support assembly also includes elastic cable 32 that connects the lower end of rear support assembly 14 to frame 12 as illustrated, and tends to cause pivot arm 18 to rotate about pivot 30 in a counterclockwise direction. When slider 20 is positioned as indicated, handle 22 may be connected to frame 12 by latch 34. In FIG. 1, latch 34 is shown in its lowermost position, wherein hook 36 extending from the latch engages the upper end of frame 12.

FIG. 1 shows carrier 10 in the stroller configuration. To collapse the carrier into the backpack configuration, latch 34 is first moved upward, disengaging hook 36 from frame 12. This permits handle 22 to pivot downward, and also permits slider 20 to slide downward along frame 12. The latter motion results in rotation of rear wheels 28 about pivot 30. As described more fully below in connection with the subsequent figures, in the fully collapsed configuration, pivot arm 18, slider arm 16, and handle 22 are all parallel to frame 12, slider 20 is positioned immediately above pivot 30, and front wheels 26 and rear wheels 28 are adjacent to one another.

For consistency, subsequent figures use reference numbers identical to those of FIG. 1 for corresponding parts. Where a single component in FIG. 1 corresponds to a pair of physical components (e.g., left and right physical components), the same reference numerals are used with lower case letters "a" and "b." Referring initially to FIGS. 2-3, frame 12 has a generally inverted U-shape and comprises left and right frame members 12a and 12b interconnected by cross member 40. THe lower ends of frame members 12a and 12b include S-shaped portions that include wheel supports 42 and ends 44. Front wheels 26 are supported from wheel supports 40 by brackets 46. Cross support 48 extends between brackets 46, and serves to add structural rigidity to the lower end of frame 12. Fabric pad 50 is supported by ends 44 and cross support 48, and serves as a foot rest for the child in the stroller configuration, and a hip rest for the wearer in the backpack configuration. The lower ends of slider arms 16a and 16b are similarly connected by a U-shaped cross support 52. To simplify manufacturing, the lower end of frame members 12, including wheel supports 42 and ends 44, may be fabricated as a separate part that is attachable to the remainder of the frame members during assembly of the carrier.

Handle 22 comprises a U-shaped member that includes cross member 56 and side members 58, the lower ends of the side members being pivotally supported by sliders 20a and 20b. Cross member 56 includes foam covering 60 to provide a comfortable grip for a person pushing the stroller. Latch 34 comprises sleeves 62 that are slidably supported by respective side members 58. Cross piece 64 extends between sleeves 62, and the central portion of cross piece 64 supports hook 36. In FIGS. 1 and 2, the hook engages cross member 40 of frame 12, and thereby prevents downward pivotal movement of the handle with respect to the frame. The engagement between hook 36 and cross member 40 will be described more fully below.

Seat support 24 is pivotally connected to frame members 12a and 12b by brackets 70 and include foam padding 72 to provide a softer outer surface adjacent to the child. Hinged connection 74 connects seat support 24 to frame member 12a above one of brackets 70. Connection 74 serves to limit the forward travel of the seat support with respect to the frame, and also serves to lock the seat support in the extended position shown in FIG. 1. A second connection 74 may be used on the other side of the carrier, if desired.

FIG. 3 shows carrier 10 with cloth seat 80 mounted in place. Cloth seat 80 may be of any suitable design that permits it to be supported by seat support 24 and the upper half of frame 12. Seat 80 includes openings 82 for the child's legs, and may include any desired padding to increase the comfort of the seat for the child and the child's safety. Seat 80 preferably includes side flaps 84 (only one shown) that extend around the outside of frame 12 and sliders 20a and 20b, to minimize the possibility of objects becoming pinched or entangled in the structural components. The forward portion of seat 80 includes adjustable strap 86 that may be affixed to support 48, to provide an appropriate weight distribution in the backpack configuration, as described below.

Figure 4:
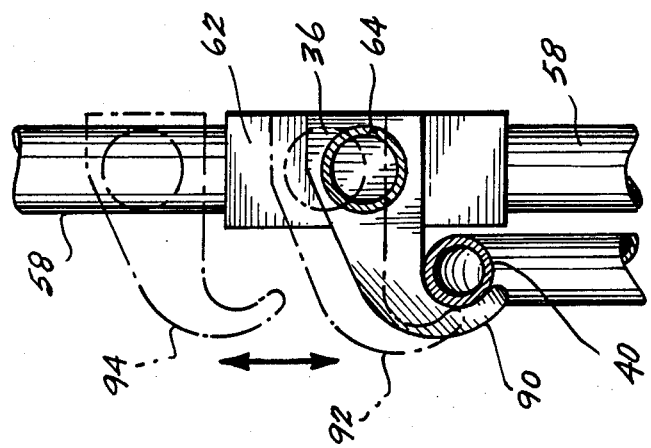
FIG. 4 illustrates the latching mechanism between the handle and frame member.

The engagement between hook 36 and frame 12 is illustrated in greater detail in FIG. 4. The hook 36 is mounted to cross piece 64 that in turn is supported between sleeves 62 (shown in FIG. 2). Hook 36 extends in a forward and downward direction from cross piece 64, and ends in tip 90. The inner radius of tip 90 preferably matches the radius of cross member 40, to produce the interengagement illustrated in FIG. 4.

To release the connection between the handle and frame, a user of the carrier bends frame 12 and side portions 58a and 58b of handle 22 towards one another for a distance sufficient to permit tip 90 to clear cross member 40, as shown in phantom by reference numeral 92 in FIG. 4. It is then possible to move hook 36 upward by sliding sleeves 62a and 62b upward along side portions 58a and 58b respectively, to the position indicated by reference numeral 94. The degree to which tip 90 curves around cross memer 40 is a function of the compliance of the frame with respect to the handle. Preferably, the overlap and compliance are adjusted so that the hook will not accidentally come loose from the frame, but can readily be disengaged when so desired by an operator.

Figure 5B:
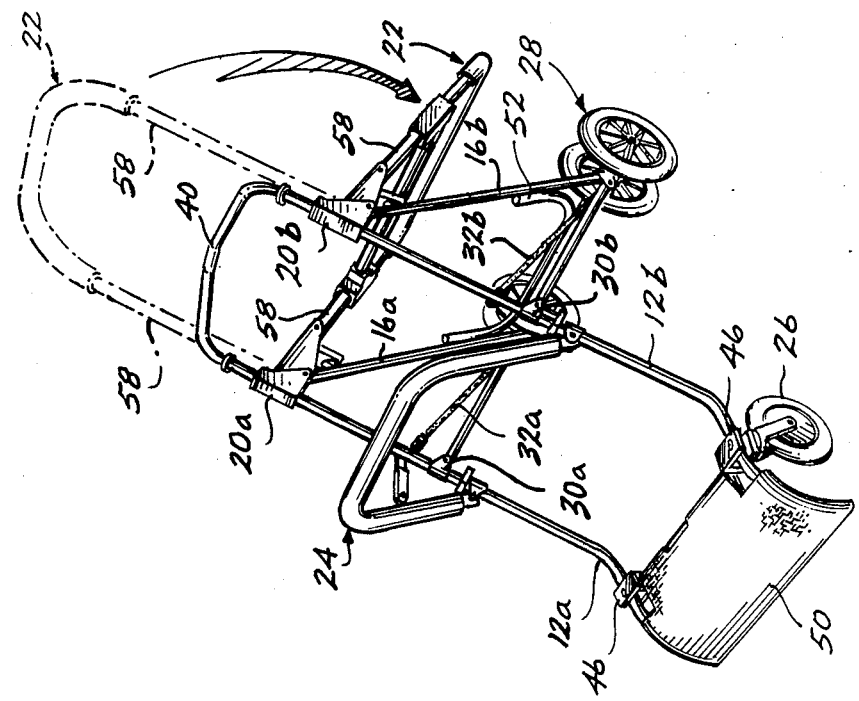
FIGS. 5A–5D are perspective views of the structural components of the carrier, showing the conversion of the carrier from the stroller configuration to the backpack or storage configuration.
Figure 5A:
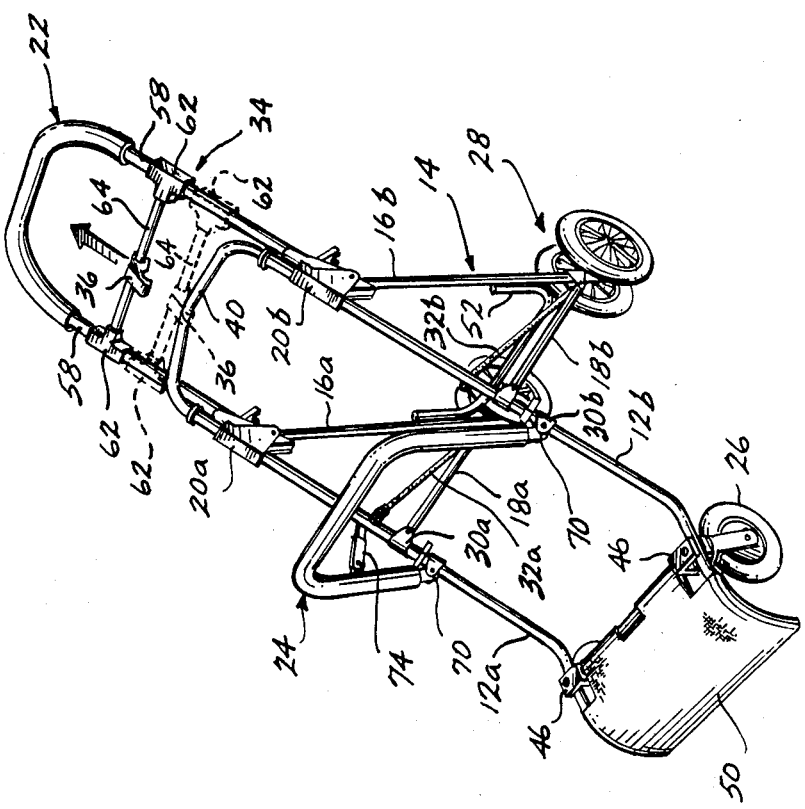
Figure 5D:
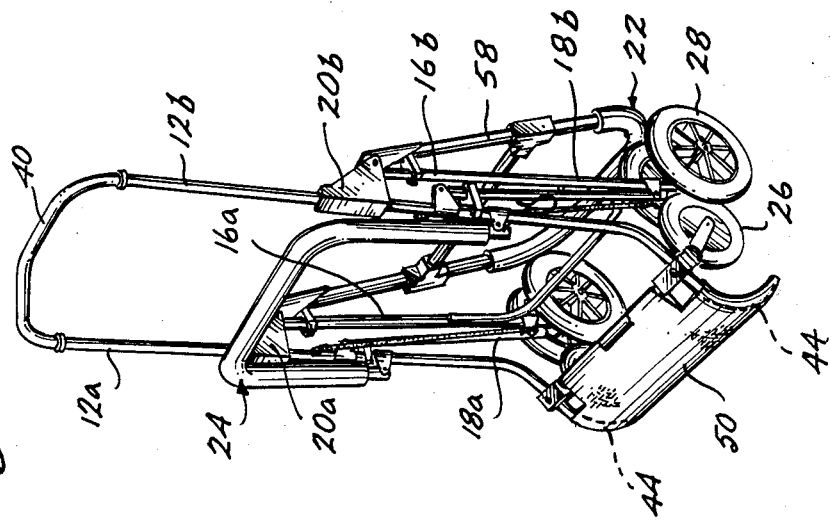
Figure 5C:
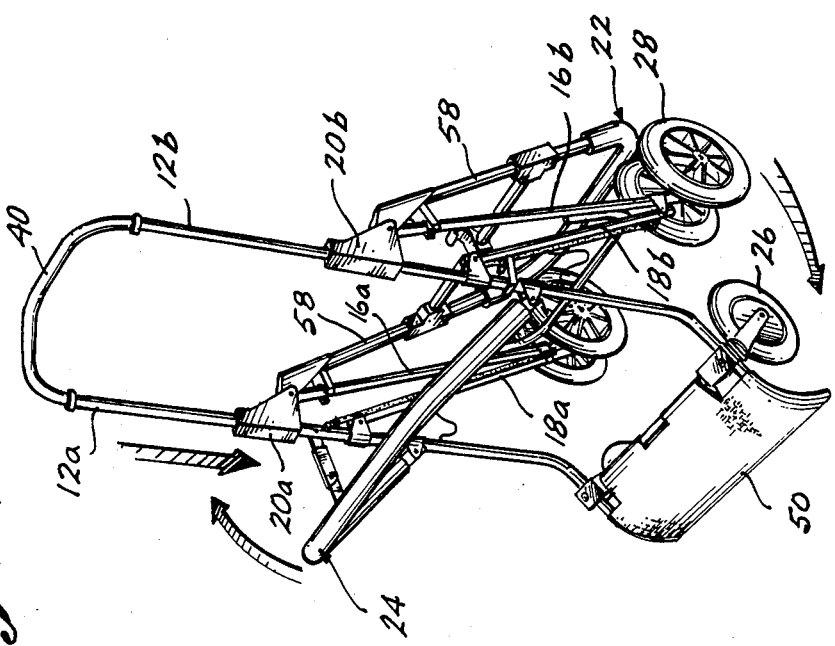

FIGS. 5A-5D illustrate the process of collapsing the carrier from the stroller configuration to the backpack configuration. The first step, illustrated in FIG. 5A, involves disengaging hook 36 from frame 12, followed by the sliding of sleeves 62 upward along side portions 58 of the handle. Once the hook is clear of the frame, handle 22 is free to rotate downward, as shown in FIG. 5B. The release of hook 30 from frame 12 also permits sliders 20a and 20b to move downward along frame members 12a and 12b, respectively. The downward movement of the sliders results in pivotal motion of rear wheels 28 about pivots 30a and 30b. This movement may be continued, as indicated in FIGS. 5C and 5D, until side portions 58, slider arms 16a and 16b, and pivot arms 18a and 18b are substantially parallel to frame members 12a and 12b. FIG. 5D also illustrates seat support 24 folded inward towards frame members 12a and 12b. This is a fully collapsed configuration, in which the carrier may be conveniently stored in a closet or the like. From this configuration, the carrier may be converted to the backpack configuration simply by rotating seat support 24 forward away from frame members 12a and 12b. The backpack configuration will be more fully described below.

As shown schematically in FIG. 1 and in greater detail in FIGS. 6A-6D below, pivot 30 is located slightly offset from the longitudinal axis of frame 12, whereas the upper ends of elastic cables 32a and 32b are secured to the frame at positions substantially on its longitudinal axis. Therefore, when the carrier is in the fully collapsed configuration shown in FIG. 5D, elastic cables 32a and 32b are slightly "over-center" with respect to pivots 30a and 30b. As a result, the elastic cables tend to hold the carrier in the collapsed configuration. In addition, ends 44 of frame 12 are preferably constructed such that in the collapsed configuration, the carrier can stand by itself on a flat surface, using ends 44 and real wheels 28 as the forward and rear supports, respectively. The collapsed carrier can thereby be stored in an upright position without external support.

The construction of the illustrated embodiment of the carrier of the present invention permits one-handed collapsing of the carrier from the stroller configuration to the backpack or storage configuration. This is a useful feature for the situation in which a child has been picked up out of the stroller and is being held in one of the parent's arms. To collapse the stroller, the person holding the child may put one foot on cross support 52, and then pull cross piece 64 upwards, disengaging hook 36 from cross member 40. Handle 22 is then allowed to drop downward, as shown in FIG. 5B. The person collapsing the stroller then pulls cross member 40 upward while continuing to hold his or her foot on cross support 52. Because sliders 20a and 20b cannot move upward because of their conection to cross support 52, the result is that frame members 12a and 12b slide through sliders 20a and 20b respectively, thereby collapsing the carrier as shown in FIGS. 5C and 5D.

FIGS. 6A-6D illustrate details of the conversion of the carrier from its backpack configuration to its stroller configuration. Referring initially to FIG. 6A, slider 20b includes body 100 that is slidably mounted on frame member 12b, and a pair of parallel spaced apart outer flanges 102 that extend from body 100 in a downward and rearward direction. Shell 104 is secured to the end of side portion 58, and includes a pair of spaced apart parallel inner flanges 106 that are most clearly shown in FIG. 6C. Shell 104 is dimensioned such that inner flanges 106 can be accommodated between outer flanges 102. Pivot pin 110 extends through and between outer flanges 102, inner flanges 106, and the upper end of slider arm 16b, such that slider arm 16b and side portion 58 are both pivotally mounted to the slider by the pivot pin.

The end of side portion 58 that is secured to shell 104 includes a snap connector 112 that extends away from shell 104 in a direction normal to the side portion. Snap connector 112 includes circular recess 114 that opens away from side portion 58. The resilience of the snap connector, and the size of circular recess 114, are selected such that when the carrier is in the backpack configuration shown in FIG. 6A, snap connector 112 engages slider arm 16b, to thereby connect the handle to the slider arm.

The first step in changing the carrier configuration from backpack to stroller is illustrated in FIG. 6B. In this figure, side portion 58 has been rotated in a counterclockwise direction about pivot pin 110. At the beginning of such a rotation, snap connector 112 is pulled free of slider arm 16b. Rotation of side portion 58 also causes shell 104 to rotate about pivot pin 110. At the end of shell 104 furthest away from side portion 58, a small pin 120 extends between inner flanges 106. At the position shown in FIG. 6B, the rotation of shell 104 has proceeded to the point at which pin 120 contacts the forward facing surface of slider arm 16b. Thus continued rotation of side portion 58 causes slider arm 16b to pivot about pivot pin 110 in the same direction as the side portion. Side portion 58 continues to rotate until it is parallel to frame member 12b, as shown in FIGS. 6C and 6D. As a result of pin 120, slider arm 16b also rotates, until the rear support is in the extended, stroller position shown in FIG. 6D and in FIGS. 1-3.

Further details of the complete carrier 10 in the backpack configuration are shown in FIG. 7. For use as a backpack, the carrier includes shoulder straps 130 that may be secured at their upper ends to the upper end of strap 86, and secured at their lower ends to brackets 46 or to adjacent structures. Stay straps 132 have their lower ends connected to respective shoulder straps 130, and their upper ends connected to seat support 24. With this arrangement, most of the weight will be borne by the hips of the person wearing the carrier, and stay straps 132 will function primarily to prevent the upper end of the carrier from rotating backward away from the person's shoulders. Hip strap 134, shown in two parts in FIG. 7, is secured to ends 44 by a suitable buckling means. In this configuration, pad 50 provides a resilient hip support for the wearer of the backpack. Preferably, shoulder straps 130 (including the stay straps) and hip strap 134 are storable in a compartment or pocket sewn into seat 80.

FIG. 8 shows carrier 10, with seat 80 attached, in a recliner configuration corresponding to FIG. 6B. In this configuration, handle 22 may be placed on the floor or ground, and the carrier may be supported by rear wheels 28 and handle 22. Further counterclockwise rotation of handle 22 with respect to frame 12 is prevented by pins 120.

FIG. 9 schematically illustrates a second embodiment of the carrier of the present invention. The carrier 210 includes frame 212, rear support assembly 214, slider 220, handle 222, and seat support 224. Rear support assembly 214 comprises slider arm 216 and pivot arm 218. Bracket 230 is secured to the upper end of frame 212, and slider 220 is moveable along the longitudinal axis of the frame, in a manner similar to that of slider 20 in FIG. 1.

Pivot arm 218 has its upper end pivotally mounted by bracket 230 at pivot 234, and mounts rear wheels 228 at its lower end. Slider arm 216 has one end pivotally mounted to slider 220, and a second end pivotally mounted to pivot arm 218 at pivot 238. Front wheels 226 are mounted to the lower, forward end of frame 212. A suitable latch (not shown) is provided for latching handle 222 to frame 212 when the handle is in the extended position illustrated in FIG. 9. Preferably, the lower end of handle 222 is also mounted at pivot 234, and handle 222 and pivot arm 218 are interconnected at pivot 234 in a manner similar to that shown at pivot 110 in FIGS. 6A-D. In particular, pivot 234 preferably includes a pin analogous to pin 120 for selectively linking rotation of the handle to that of the rear support assembly.

Carrier 210 can change between stroller, backpack, recliner, and storage configurations in a manner similar to carrier 10 shown in FIG. 1. To collapse carrier 210, handle 222 is first unlatched from the upper end of frame 212, permitting the handle to pivot downward from the extended position to a collapsed position in which it is parallel to pivot arm 218. Release of the latch between the handle and frame permits rotation of rear wheels 228 about bracket 230, while slider 220 slides down the longitudinal axis of frame 212. In the fully collapsed configuration, slider arm 216 and pivot arm 218 are parallel to frame 212.

An alternate implementation of the latch between the handle and frame is illustrated in FIGS. 10 and 11A-11C. Referring initially to FIG. 10, the alternate latch mechanism includes actuator 240 and latch mechanisms 242 interconnected by respective cables 244. As shown in greater detail in FIG. 11A, each latch mechanism 242 comprises bracket 250 having one end connected to the adjacent frame member 12*b* and having a U-shaped cutout 252 in its opposite end. Side portion 58 of handle 22 includes an elongated lateral slot 254 through which pin 256 extends. The pin is connected between one end of cable 244 and opposing spring 258. In the positions shown in FIG. 11A, the engagement between pin 256 and cutout 252 latches handle 22 to frame 12. However when a user operates actuator 240, cable 244 pulls pin 256 out of cutout 252, unlatching the handle from the frame, and permitting handle 22 to rotate away from frame 12, as shown in phantom in FIG. 11A.

As illustrated in FIGS. 11B and 11C, actuator 240 comprises member 260 that includes one end that extends out of top portion 56 of handle 22, and that is pivotally connected at its opposite end to links 262 that are in turn connected to cables 244. The actuator is shown in FIG. 11A in its normal, unactuated position. When it is desired to unlatch the handle from the frame, the operator of the carrier pushes member 260 inward, causing links 262 to pull on cables 244, thus providing the desired unlatching mechanism, as shown in FIG. 11C.

While the preferred embodiments of the invention have been illustrated and described, variations will be apparent to those skilled in the art. Accordingly, the invention is not to be limited to the described embodiments, but instead is to be determined with respect to the following claims.

The embodiments of the invention in which an exclusive property or privilege is claimed are defined as follows:

1. A child carrier usable as a backpack and as a stroller, the carrier comprising:
    a frame having upper and lower ends and a longitudinal axis extending therebetween;
    front ground support means rotatably supported by the frame adjacent to the lower end;
    child support means connectable to the frame;
    back support means connectable to the frame for securing the carrier to a person's back, such that the carrier can be used as a backpack;
    a rear support assembly connected to the frame, the rear support assembly comprising connection means connected to the frame such that the connection means is moveable along the longitudinal axis of the frame, a first member pivotally connected to the connection means, and a second member pivotally connected to the first member and to the frame;
    rear ground support means rotatably mounted by the rear support assembly;
    the rear support assembly being movable to a first position in which the rear ground support means is adjacent to the frame, for permitting use of the carrier as a backpack, and to a second position in which the rear ground support means is positioned away from the frame such that the front and rear ground support means are spaced apart fromt one another, for use of the carrier as a stroller.
    a handle and means for mounting the handle such that the handle is pivotable with respect to the frame to a collapsed position in which the handle is adjacent to the frame and to an extended position in which the handle extends away from the frame; and
    coupling means for coupling the movement of the handle between the collapsed and extended positions to the movement of the rear support assembly between its first and second positions, such that movement of the handle to the extended position causes movement of the rear support assembly to the second position.

2. The carrier of claim 1, wherein the coupling means limits the movement of the handle towards the extended position when the rear support assembly is in the first position, such that when the rear support assembly is in the first position, the carrier can assume a recliner configuration in which the carrier is supportable by the handle and the rear ground support means.

3. The carrier of claim 1, wherein the handle and a portion of the rear support assembly are rotatable around a common pivot axis.

4. A child carrier usable as a backpack and as a stroller, the carrier comprising:
    a frame having upper and lower ends and a longitudinal axis extending therebetween;
    front ground support means rotatably supported by the frame adjacent to the lower end;
    child support means connectable to the frame;
    back support means connectable to the frame for securing the carrier to a person's back, such that the carrier can be used as a backpack;
    a rear support assembly connected to the frame, the rear support assembly comprising connection means connected to the frame such that the connection means is moveable along the longitudinal axis of the frame, a first member pivotally connected to the connection means, and a second member pivotally connected to the first member and to the frame;
    rear ground support means rotatably mounted by the rear support assembly;
    the rear support assembly being movable to a first position in which the rear ground support means is adjacent to the frame, for permitting use of the carrier as a backpack, and to a second position in which the rear ground support means is positioned away from the frame such that the front and rear ground support means are spaced apart from one another, for use of the carrier as a stroller;
    the frame including a pair of spaced apart frame members extending along the longitudinal axis between the upper and lower ends, the connection means comprising a connector slidably mounted on each frame member such that each connector can move along the longitudinal axis; and
    the rear support assembly comprising a slider arm associated with each connector, each slider arm having a first end at which the slider arm is pivotally mounted to the associated connector and a second end, the rear support assembly further comprising a pivot arm associated with each slider arm, each pivot arm having a first end pivotally connected to the frame and a second end pivotally connected to the associated slider arm.

5. The carrier of claim 4, wherein each frame member is coplanar with respect to its associated slider and pivot arms.

6. The carrier of claim 4, wherein the rear support assembly further comprises spring means connected between the rear support assembly and frame such that the rear support assembly is resiliently biased towards the second position.

7. The carrier of claim 6, wherein the spring means is positioned such that it is slightly over center with respect to the pivotal connection between the pivot arm and frame, such that when the rear support assembly is in the second position, the spring means initially resist movement of the rear support assembly out of the second position.

8. A child carrier usable as a backpack and as a stroller, the carrier comprising:
a frame having upper and lower ends and a longitudinal axis extending therebetween;
front ground support means rotatably supported by the frame adjacent to the lower end;
child support means connectable to the frame;
back support means connectable to the frame for securing the carrier to a person's back, such that the carrier can be used as a backpack;
a rear support assembly connected to the frame, the rear support assembly comprising connection means connected to the frame such that the connection means is moveable along the longitudinal axis of the frame, a first member pivotally connected to the connection means, and a second member pivotally connected to the first member and to the frame;
rear ground support means rotatably mounted by the rear support assembly;
the rear support assembly being movable to a first position in which the rear ground support means is adjacent to the frame, for permitting use of the carrier as a backpack, and to a second position in which the rear ground support means is positioned away from the frame such that the front and rear ground support means are spaced apart from one another, for use of the carrier as a stroller;
the frame including a pair of spaced apart frame members extending along the longitudinal axis between the upper and lower ends, the connection means comprising a connector slidably mounted on each frame member such that each connector can move along the longitudinal axis; and
a handle having first and second side members, each side member having a lower end pivotally mounted to a respective one of the connectors and an upper end, the handle being pivotal with respect to the frame to a collapsed position in which the handle is adjacent to the frame and to an extended position in which the handle extends away from the frame.

9. The carrier of claim 8, wherein the handle comprises a cross member slidably mounted to the side members and means connected to the cross member for engaging the frame when the handle is in the extended position, to thereby latch the handle in the extended position.

10. A child carrier usable as a backpack and as as stroller, the carrier comprising:
a frame having upper and lower ends and a longitudinal axis extending therebetween;
front ground support means rotatably supported by the frame adjacent to the lower end;
child support means connectable to the frame;
back support means connectable to the frame for securing the carrier to a person's back, such that the carrier can be used as a backpack;
a rear support assembly connected to the frame, the rear support assembly comprising connection means connected to the frame such that the connection means is movable along the longitudinal axis of the frame, a first member pivotally connected to the connection means, and a second member pivotally connected to the first member and to the frame;
rear ground support means rotatably mounted by the rear support assembly;
the rear support assembly being movable to a first position in which the rear ground support means is adjacent to the frame, for permitting use of the carrier as a backpack, and to a second position, in which the rear ground support means is positioned away from the frame such that the front and rear ground support means are spaced apart from one another, for use of the carrier as a stroller;
the frame including a pair of spaced apart frame members extending along the longitudinal axis between the upper and lower ends, the connection means comprising a connector slidably mounted on each frame member such that each connector can move along the longitudinal axis; and
the rear support assembly comprising a pivot arm and a slider arm associated with each frame member and connector, the pivot arm having a first end connected to the frame and a second end, the slider arm having a first end pivotally connected to the connector and a second end pivotally connected to the pivot arm.

11. The carrier of claim 1, further comprising a latch for selectively latching the handle in the extended position.

12. The carrier of claim 11, wherein the handle comprises a cross member slidably mounted to the side members and means connected to the cross member for engaging the frame when the handle is in the extended position, to thereby latch the handle in the extended position.

13. The carrier of claim 4, further comprising a handle and means for mounting the handle such that the handle is pivotable with respect to the frame to a collapsed position in which the handle is adjacent to the frame and to an extended position in which the handle extends away from the frame.

14. The carrier of claim 13, wherein the handle comprises a cross member slidably mounted to the side members and means connected to the cross member for engaging the frame when the handle is in the extended position, to thereby latch the handle in the extended position.

15. The carrier of claim 13, further comprising coupling means for coupling the movement of the handle between the collapsed and extended positions to the movement of the rear support assembly between its first and second positions, such that movement of the handle to the extended position causes movement of the rear support assembly to the second position.

16. The carrier of claim 15, wherein the coupling means limits the movement of the handle towards the extended position when the rear support assembly is in the first position, such that when the rear support assembly is in the first position, the carrier can assume a recliner configuration in which the carrier is supportable by the handle and the rear ground support means.

17. The carrier of claim 15, wherein the handle and a portion of the rear support assembly are rotatable around a common pivot axis.

18. The carrier of claim 10, further comprising a handle and means for mounting the handle such that the handle is pivotable with respect to the frame to a collapsed position in which the handle is adjacent to the frame and to an extended position in which the handle extends away from the frame.

19. The carrier of claim 18, wherein the handle comprises a cross member slidably mounted to the side members and means connected to the cross member for engaging the frame when the handle is in the extended position, to thereby latch the handle in the extended position.

20. The carrier of claim 19, further comprising coupling means for coupling the movement of the handle between the collapsed and extended positions to the movement of the rear support assembly between its first and second positions, such that movement of the handle to the extended position causes movement of the rear support assembly to the second position.

21. The carrier of claim 20, wherein the coupling means limits the movement of the handle towards the extended position when the rear support assembly is in the first position, such that when the rear support assembly is in the first position, the carrier can assume a recliner configuration in which the carrier is supportable by the handle and the rear ground support means.

22. The carrier of claim 20, wherein the handle and a portion of the rear support assembly are rotatable around a common pivot axis.

* * * * *